US010274297B2

(12) United States Patent
Noda et al.

(10) Patent No.: US 10,274,297 B2
(45) Date of Patent: Apr. 30, 2019

(54) METHOD FOR CONTROLLING SHAPE MEASURING APPARATUS

(71) Applicant: MITUTOYO CORPORATION, Kanagawa (JP)

(72) Inventors: Takashi Noda, Tochigi (JP); Hiromi Deguchi, Tochigi (JP); Naoya Kikuchi, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 317 days.

(21) Appl. No.: 15/158,800

(22) Filed: May 19, 2016

(65) Prior Publication Data

US 2016/0356591 A1 Dec. 8, 2016

(30) Foreign Application Priority Data

Jun. 2, 2015 (JP) .................................. 2015-111960

(51) Int. Cl.
*G06F 3/0484* (2013.01)
*G01B 3/00* (2006.01)
(Continued)

(52) U.S. Cl.
CPC ............. *G01B 3/002* (2013.01); *G01B 5/008* (2013.01); *G01B 5/20* (2013.01); *G06F 3/04817* (2013.01);
(Continued)

(58) Field of Classification Search
CPC . G06F 3/04842; G06F 3/04817; G01B 3/002; G01B 5/20
See application file for complete search history.

(56) References Cited

U.S. PATENT DOCUMENTS 4,901,253 A 2/1990 Iwano et al.
6,400,998 B1 6/2002 Yamazaki et al.
(Continued)

FOREIGN PATENT DOCUMENTS

DE 102014225482 A1 6/2015
EP 2270615 A1 1/2011
(Continued)

OTHER PUBLICATIONS

Communication pursuant to Article 94(3) EPC in European Patent Application No. 16171395.3, dated Oct. 5, 2017.
(Continued)

*Primary Examiner* — Daeho D Song
(74) *Attorney, Agent, or Firm* — Greenblum & Bernstein, P.L.C.

(57) ABSTRACT

A method for nominal scanning measurement includes allowing a user to select a shape of an object to be measured from a geometric shape menu prepared in advance, allowing the user to input, according to the selected geometric shape, a parameter to specify the geometric shape, allowing the user to select a measurement path from a measurement path menu prepared in advance, allowing the user to input, according to the selected measurement path, a parameter to specify the measurement path, calculating, based on the selected geometric shape, the input parameter of the geometric shape, the selected measurement path, and the input parameter of the measurement path, measurement points on a workpiece and a normal line direction at each of measurement points using a calculation formula prepared in advance, and calculating a path for scanning measurement to move while scanning a sequence of the measurement points.

9 Claims, 15 Drawing Sheets

(51) Int. Cl.
  *G01B 5/20* (2006.01)
  *G06F 3/0481* (2013.01)
  *G01B 5/008* (2006.01)

(52) U.S. Cl.
  CPC ............ *G06F 3/04842* (2013.01); *G05B 2219/37193* (2013.01); *G05B 2219/37449* (2013.01); *G05B 2219/37452* (2013.01)

(56) References Cited

U.S. PATENT DOCUMENTS

| | | | |
|---|---|---|---|
| 6,445,972 B1* | 9/2002 | Takegahara | G05B 19/40937 700/162 |
| 6,460,261 B1* | 10/2002 | Noda | G01B 5/241 33/199 R |
| 7,051,449 B2* | 5/2006 | Eichner | G01B 5/0009 33/1 M |
| 7,146,291 B2 | 12/2006 | Hough | |
| 7,643,963 B2 | 1/2010 | Noda et al. | |
| 7,958,564 B2 | 6/2011 | Noda et al. | |
| 2002/0033454 A1* | 3/2002 | Cheng | A61B 5/14546 250/339.12 |
| 2004/0039484 A1* | 2/2004 | Watanabe | G05B 19/41825 700/245 |
| 2004/0107073 A1* | 6/2004 | Sakurada | G01B 5/012 702/167 |
| 2005/0032471 A1* | 2/2005 | Pfarr | B23K 26/0838 452/181 |
| 2005/0061781 A1* | 3/2005 | Jense | B23K 26/0846 219/121.8 |
| 2005/0154490 A1* | 7/2005 | Blaine | A22C 17/0086 700/186 |
| 2006/0043292 A1* | 3/2006 | Matsui | H01J 37/28 250/310 |
| 2006/0161382 A1* | 7/2006 | Kaneyasu | G01B 11/005 702/168 |
| 2007/0005178 A1 | 1/2007 | Prestidge et al. | |
| 2008/0249737 A1* | 10/2008 | Jordil | G01B 3/008 702/152 |
| 2011/0264402 A1 | 10/2011 | Anderson et al. | |
| 2012/0144685 A1 | 6/2012 | Atwell et al. | |
| 2013/0041624 A1* | 2/2013 | Li | G01B 21/04 702/168 |
| 2013/0310962 A1 | 11/2013 | Noda et al. | |
| 2014/0005978 A1* | 1/2014 | Shimizu | G01B 21/20 702/167 |
| 2014/0025336 A1 | 1/2014 | Noda et al. | |
| 2014/0286565 A1* | 9/2014 | Ikenaga | G06K 9/6254 382/152 |
| 2015/0012245 A1* | 1/2015 | Xiao | G01B 11/255 702/168 |
| 2015/0169790 A1 | 6/2015 | Tseo et al. | |

FOREIGN PATENT DOCUMENTS

| | | |
|---|---|---|
| JP | 2008-241420 A | 10/2008 |
| JP | 5089428 B | 9/2009 |
| JP | 2013-238573 A | 11/2013 |
| JP | 2014-21004 A | 2/2014 |

OTHER PUBLICATIONS

Extended European Search Report in European Patent Application No. 16171395.3, dated Sep. 28, 2016.
Communication under Rule 71(3) indicating an intention to grant a European patent from the European Patent office in European Application No. 16171395.3 dated May 9, 2018.

* cited by examiner

SELECT MEASUREMENT METHOD

☐ PASSIVE NOMINAL SCANNING MEASUREMENT

☐ ACTIVE NOMINAL SCANNING MEASUREMENT

☐ AUTONOMOUS SCANNING MEASUREMENT

☐ POINT MEASUREMENT

☑ SIMPLIFIED NOMINAL SCANNING MEASUREMENT

Fig. 7

METHOD FOR CONTROLLING SHAPE MEASURING APPARATUS

INCORPORATION BY REFERENCE

This application is based upon and claims the benefit of priority from Japanese patent application No. 2015-111960, filed on Jun. 2, 2015, the disclosure of which is incorporated herein in its entirety by reference.

BACKGROUND OF THE INVENTION

1. Field of the Invention

The present invention relates to a method for controlling a shape measuring apparatus.

2. Description of Related Art

There has been known a shape measuring apparatus which measures a shape of an object to be measured by moving a stylus head while scanning a surface of the object to be measured (for example, JP 2008-241420 A, JP 2013-238573 A, and JP 2014-21004 A).

To perform scanning measurement, a path for the scanning measurement needs to be generated.

The device disclosed in JP 2008-241420 A converts a design data (for example, non-uniform rational B-spline (NURBS) data) based on CAD data into a group of polynomials curves in a predetermined degree.

CAD data (for example, NURBS data) including path information is received from an external CAD system or the like, and the CAD data is converted into data of a group of points. The data at each point is combined data of coordinates (x, y, z) and normal line directions (P, Q, R). (That is, the data indicates (x, y, z, P, Q, R).)

In this description, the data having information of (x, y, z, P, Q, R) is referred to as contour point data.

Next, the coordinates at each point are offset by a predetermined amount in the normal line direction. (The predetermined amount is, particularly, a stylus head radius r—an amount of deflection $E_p$.) The data of a group of points calculated in this manner is referred to as "offset contour point data".

Then, the offset contour point data is converted into a group of polynomials curves in a predetermined degree.

Here, it is assumed that the polynomials is a cubic function, and the curves are parametric cubic curves (PCC).

Based on the PCC curve, a path to measure a workpiece is generated.

Furthermore, a PCC curve is divided into a group of divided PCC curves. A speed curve is calculated from the group of divided PCC curves, and then, a moving speed (moving vector) of a probe is calculated. (For example, a moving speed (moving vector) of a probe is set based on a curvature of each segment of the group of divided PCC curves or the like.)

The probe is moved according to the moving speed calculated in the above manner, and a stylus head is moved while scanning a surface of an object to be measured (passive nominal scanning measurement: note that the word "nominal" in this description means scanning along a predetermined trajectory calculated in advance based on design data of an object.).

Furthermore, there has been known a method to perform scanning measurement while correcting a trajectory by continuously calculating a deflection correcting vector so that an amount of deflection of a probe becomes constant (JP 2013-238573 A).

In this description, such scanning is referred to as "active nominal scanning measurement".

Moreover, there has been known a method to perform scanning measurement while generating a trajectory without using design data (autonomous scanning measurement, for example JP 5089428 B).

As described above, there are three measurement methods of passive nominal scanning measurement, active nominal scanning measurement, and autonomous scanning measurement, and each of them has merits and demerits.

For example, although all workpieces could be measured by the autonomous scanning measurement, the autonomous scanning measurement takes a long time.

For example, a moving speed of a probe in the autonomous scanning measurement is about 10 mm/sec to 15 mm/sec, and a moving speed of a probe in the nominal scanning measurement is about 50 mm/sec to 100 mm/sec. Thus, it is expected that the autonomous scanning measurement takes time about ten times longer than the nominal scanning measurement.

SUMMARY OF THE INVENTION

Nominal scanning measurement has an excellent measurement efficiency, but needs a rather high-performance computer (graphic workstation) to perform processing, such as converting CAD data or the like into PCC curves. If a user frequently uses a coordinate measuring machine which measures a number of workpieces having complicated shapes, the user can invest in an expensive computer (graphic workstation).

However, on the other hand, there are demands from a user who occasionally needs to simply measure a unique object, such as a trial product or a special order product.

Thus, it is desirable that nominal scanning measurement is to be easily used by a light user without CAD data or a high-performance PC.

In an embodiment of the present invention, a method for controlling a shape measuring apparatus which includes a probe having a stylus head at a tip and a moving mechanism to move the probe, and measures a shape of a workpiece by detecting contact between the stylus head and a surface of the workpiece, the method includes:

allowing a user to select a shape of an object to be measured from a geometric shape menu prepared in advance;

allowing the user to select a measurement path from a measurement path menu prepared in advance;

calculating, based on the selected geometric shape and the selected measurement path, measurement points and a normal line direction at each of the measurement points on the workpiece using a calculation formula prepared in advance; and calculating a path for scanning measurement to move while scanning a sequence of the measurement points, and performing the scanning measurement to scan the path for the scanning measurement.

In an embodiment of the present invention, the method preferably includes:

allowing the user to input, according to the selected geometric shape, a parameter to specify the geometric shape;

allowing the user to input, according to the selected measurement path, a parameter to specify the measurement path; and calculating, based on the selected geometric shape, the input parameter of the geometric shape, the selected measurement path, and the input parameter of the measurement path, measurement points and a normal line direction at each of the measurement points on a workpiece using a calculation formula prepared in advance.

In an embodiment of the present invention, the geometric shape menu preferably includes, at least, a sphere, a columnar body, a cone body, and a plane.

In an embodiment of the present invention, the measurement path menu preferably includes, at least, a spiral and a sine curve.

In an embodiment of the present invention, a control program for a shape measuring apparatus causing a computer to execute a method for controlling the shape measuring apparatus.

BRIEF DESCRIPTION OF THE DRAWINGS

FIG. 7 is a diagram exemplifying a selection menu;

DETAILED DESCRIPTION

Summary of the Present Invention

Figure 1:
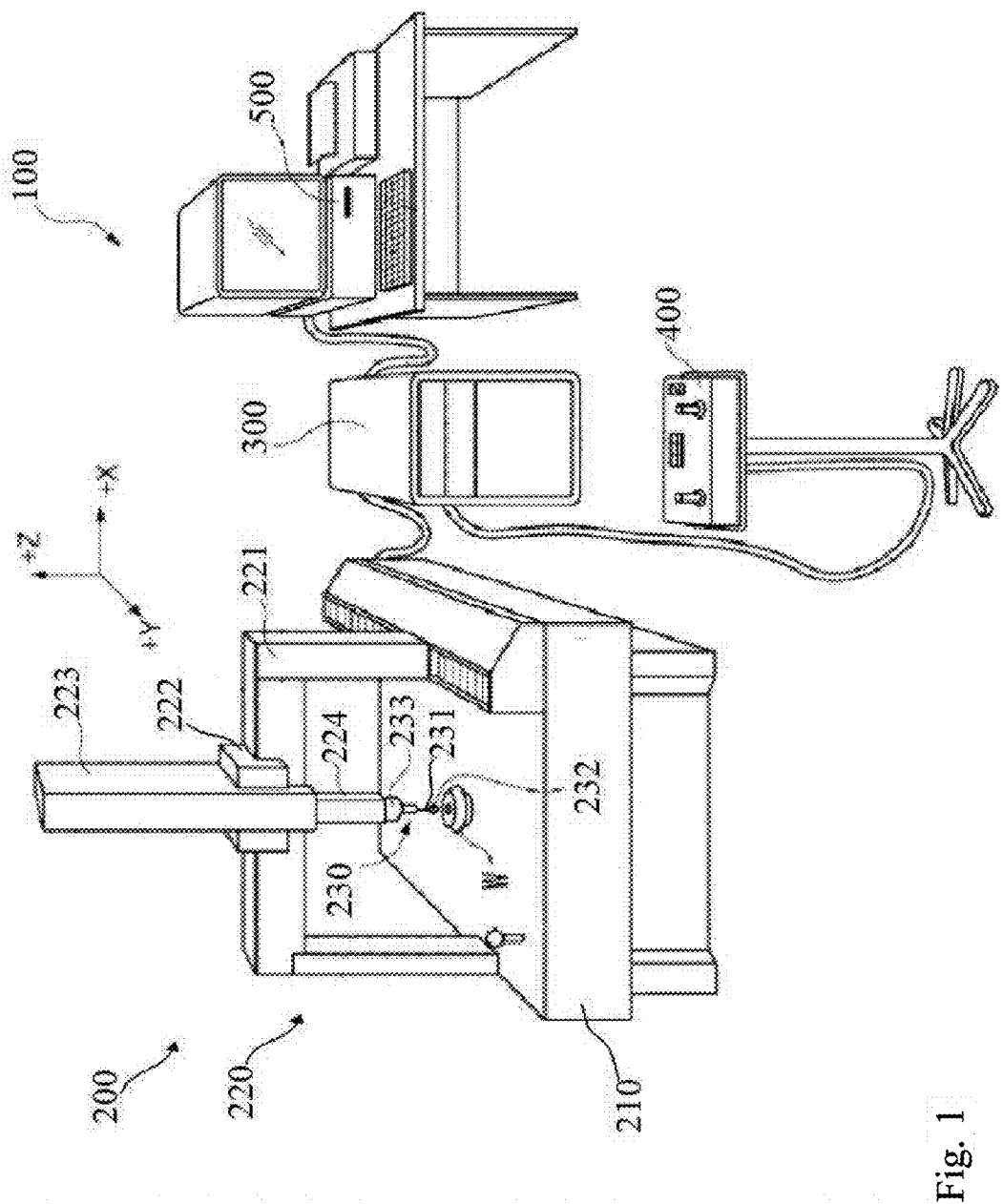
FIG. 1 is a diagram illustrating an entire configuration of a shape measuring system.

It has been described that there are demands, for example, from a user who occasionally needs to simply measure a unique object, such as a trial product or a special order product.

Analyzing these demands, a point to be measured is a geometric shape, such as a part of a plane, a part of a sphere, a part of a cylinder, or a part of a cone, or can be mostly replaced with a geometric shape.

Thus, to perform nominal scanning measurement, a menu for nominal scanning measurement using approximation functions, instead of CAD data, is prepared in advance. The demands from a light user can be satisfied without CAD data or a high-performance computer (graphic workstation) accordingly.

Embodiments of the present invention will be illustrated and described with reference to reference signs assigned to elements in the drawings.

First Exemplary Embodiment

FIG. 1 is a diagram illustrating an entire configuration of a shape measuring system 100.

The basic configuration of the shape measuring system 100 has been known, but will be briefly described.

The shape measuring system 100 includes a coordinate measuring machine 200, a motion controller 300 which controls the drive of the coordinate measuring machine 200, and a host computer 500 which controls the motion controller 300 and executes necessary data processing.

The coordinate measuring machine 200 includes a base 210, a moving mechanism 220, and a probe 230.

The moving mechanism 220 includes a gate type Y slider 221, an X slider 222, a Z axis column 223, and a Z spindle 224. The Y slider 221 is provided slidably on the base 210 in a Y direction. The X slider 222 slides along a beam of the Y slider 221 in an X direction. The Z axis column 223 is secured to the X slider 222. The Z spindle 224 moves up and down inside the Z axis column 223 in a Z direction.

A driving motor (not illustrated) and an encoder (not illustrated) are fixed on each of the Y slider 221, the X slider 222, and the Z spindle 224.

Drive control signals from the motion controller 300 control the drive of the driving motors.

The encoder detects a moving amount of each of the Y slider 221, the X slider 222, and the Z spindle 224, and outputs the detection value to the motion controller 300.

The probe 230 is attached to the lower end of the Z spindle 224.

The probe 230 includes a stylus 231 and a supporting part 233. The stylus 231 has a stylus head 232 at a tip side (−Z axis direction side). The supporting part 233 supports a base end side (+Z axis direction side) of the stylus 231.

The stylus head 232 has a spherical shape and is brought into contact with an object W to be measured.

When an external force is applied to the stylus 231, that is, when the stylus head 232 is brought into contact with an object to be measured, the supporting part 233 supports the stylus 231 so that the stylus 231 is movable in the directions of the X, Y, and Z axes within a certain range. The supporting part 233 further includes a probe sensor (not illustrated) to detect a position of the stylus 231 in each axis direction.

The probe sensor outputs the detection value to the motion controller 300.

(Configuration of the Motion Controller 300)

Figure 2:
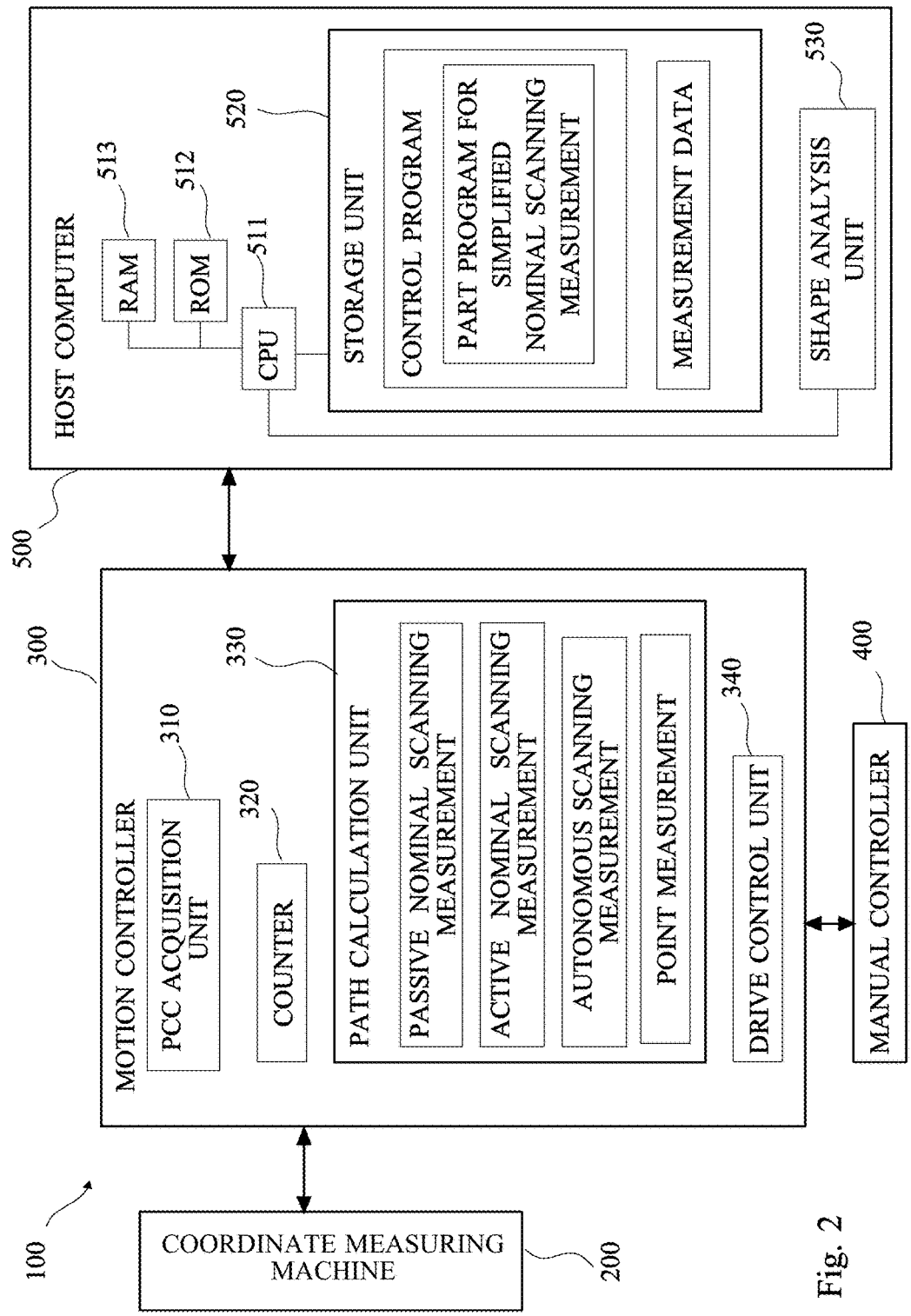
FIG. 2 is a functional block diagram of a motion controller and a host computer.

FIG. 2 is a functional block diagram of the motion controller 300 and the host computer 500.

The motion controller 300 includes a PCC acquisition unit 310, a counter 320, a path calculation unit 330, and a drive control unit 340.

The PCC acquisition unit 310 acquires PCC curve data from the host computer 500.

The counter 320 measures an amount of displacement of each slider by counting detection signals output from the encoder, and measures an amount of displacement of the probe 230 (the stylus 231) by counting detection signals output from each probe sensor.

From the measured displacement of the slider and the probe 230, a coordinate position PP (hereinafter, referred to as a probe position PP) of the stylus head 232 is obtained. Furthermore, from the displacement (the detection values of the probe sensor (Px, Py, Pz)) of the stylus 231 measured by the counter 320, an amount of deflection (an absolute value of a vector Ep) of the stylus head 232 is obtained.

The path calculation unit 330 calculates a movement path for the probe 230 (the stylus head 232) to measure a surface of an object to be measured with the probe 230 (the stylus head 232), and calculates a velocity component vector (path velocity vector) along the movement path.

The path calculation unit 330 includes functional units to calculate a path according to measurement methods (measurement modes). Specifically, there are four methods of passive nominal scanning measurement, active nominal scanning measurement, autonomous scanning measurement, and point measurement.

The measurement methods will be described later as needed.

The drive control unit 340 controls the drive of each slider based on the moving vector calculated by the path calculation unit 330.

Note that, a manual controller 400 is connected to the motion controller 300.

The manual controller 400 includes a joystick and various buttons, receives a manual input operation from a user, and transmits the user's operations instruction to the motion controller 300.

In this case, the motion controller 300 (the drive control unit 340) controls the drive of each slider in response to the user's operations instruction.

(Configuration of the Host Computer 500)

The host computer 500 includes a central processing unit (CPU) 511 and a memory, and controls the coordinate measuring machine 200 through the motion controller 300.

The host computer 500 further includes a storage unit 520 and a shape analysis unit 530.

The storage unit 520 stores measurement data obtained by measurement, and a measurement control program to control a whole measurement operation.

In the present exemplary embodiment, a part program for the simplified nominal scanning measurement is included as a part of the control program.

Figure 3:
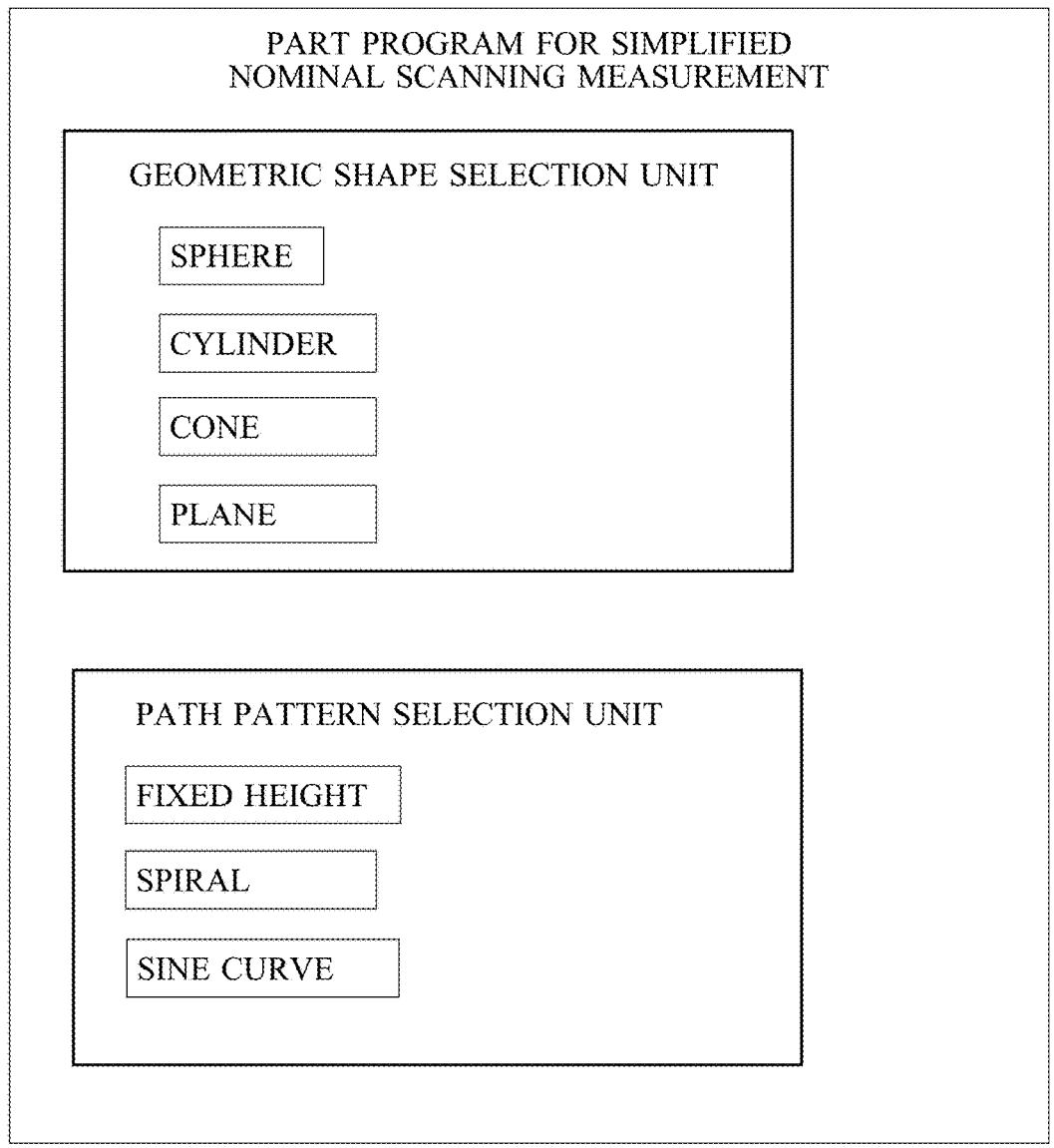
FIG. 3 is a diagram illustrating a functional configuration of a simplified nominal scanning measurement part program.

The part program for the simplified nominal scanning measurement is roughly divided into two function units as illustrated in FIG. 3. One is a geometric shape selection unit, and the other is a path pattern selection unit.

Examples of operations controlled by the selection units will be described later.

A part program for simplified nominal scanning measurement is too long to repeat, and is referred to as a "simplified measurement part program".

The shape analysis unit 530 calculates surface shape data of the object to be measured based on the measurement data output from the motion controller 300, and performs shape analysis to calculate error or distortion of the calculated surface shape data of the object to be measured.

The shape analysis unit 530 further performs arithmetic processing, such as conversion of various parameters input to perform the simplified nominal scanning measurement into PCC curves.

The CPU 511 executes the measurement control program, and thus the measurement operations of the present exemplary embodiment is implemented.

An output device (a display or a printer) and an input device (a keyboard or a mouse) are connected to the host computer 500 as needed.

(Description of the Measurement Operation)

The measurement operations of the present exemplary embodiment will be described.

The present exemplary embodiment is to perform nominal scanning measurement without design data, and which is referred to as "simplified nominal scanning measurement".

Figure 4:
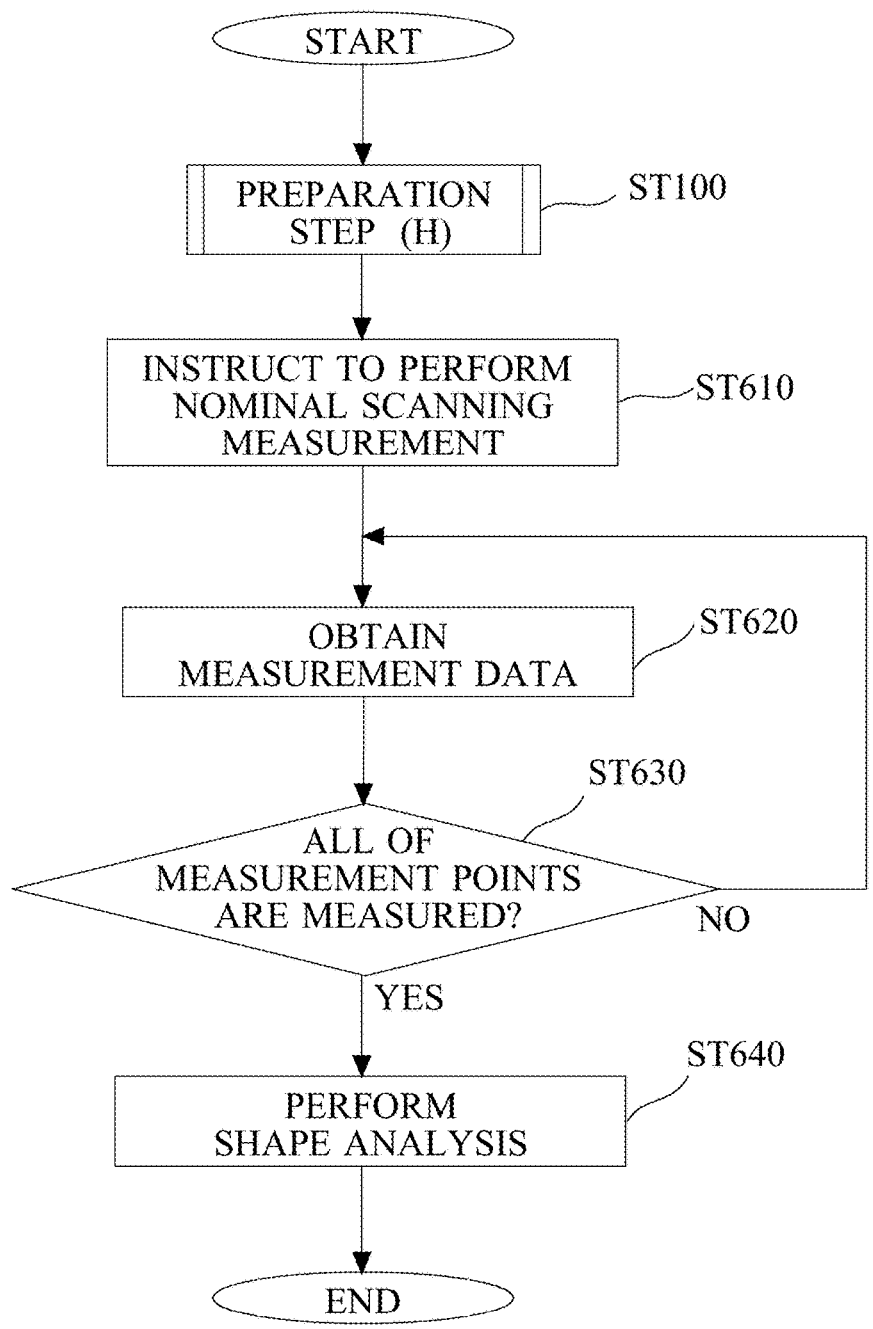
FIG. 4 is an entire flowchart for explaining operations of simplified nominal scanning measurement.

Procedures of the present exemplary embodiment are illustrated in FIG. 4 and described in order.

FIG. 4 is a flowchart for explaining operations in the simplified nominal scanning measurement.

Figure 13:
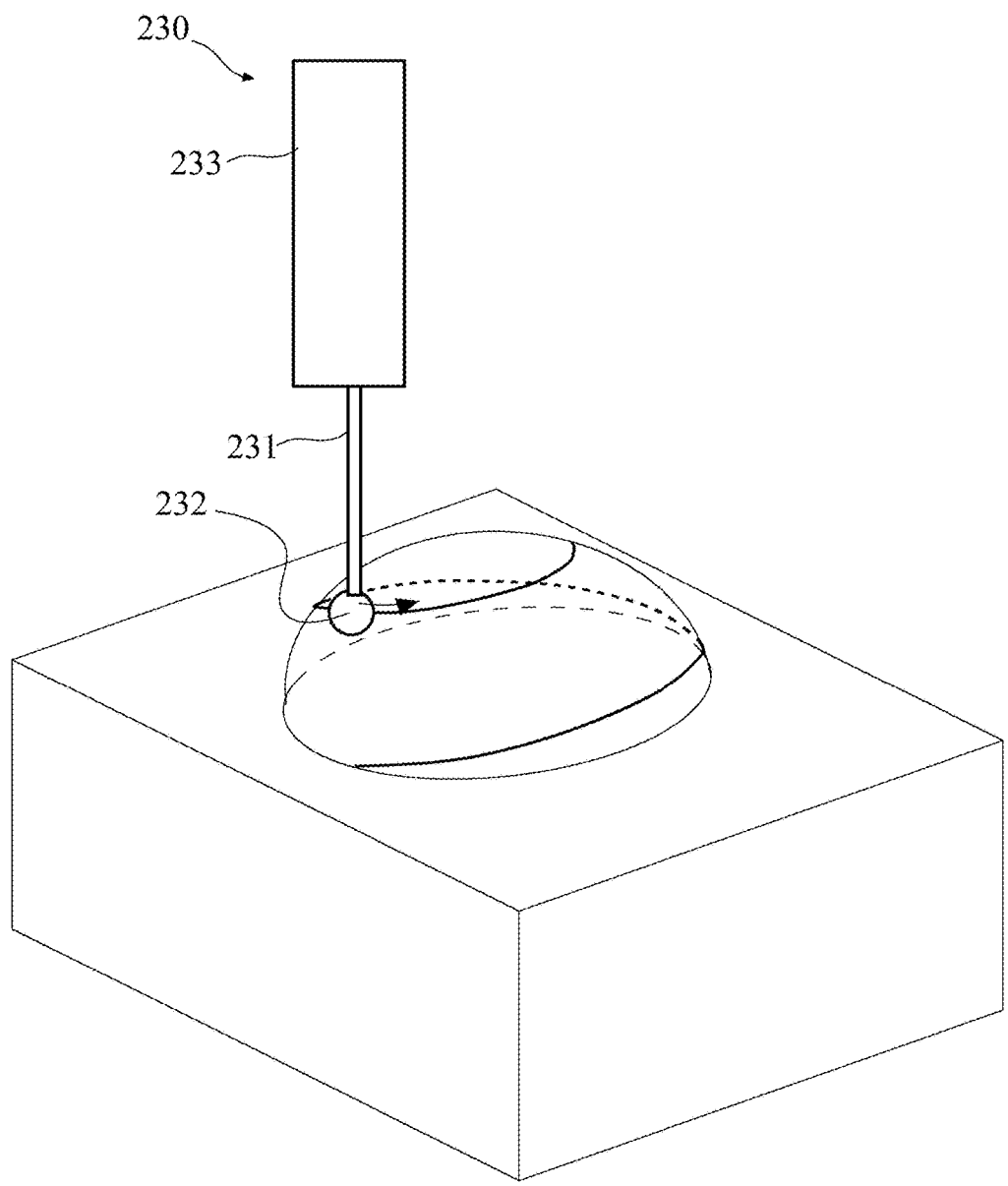
FIG. 13 is a diagram illustrating that scanning measurement is performed to a spherical workpiece with a spiral path.

Note that, the goal is to perform the scanning measurement to a sphere surface with a spiral path illustrated in FIG. 13.

First, preparation necessary for scanning measurement is performed (a preparation step ST100).

The preparation step (ST100) is performed by the host computer 500.

Figure 5:
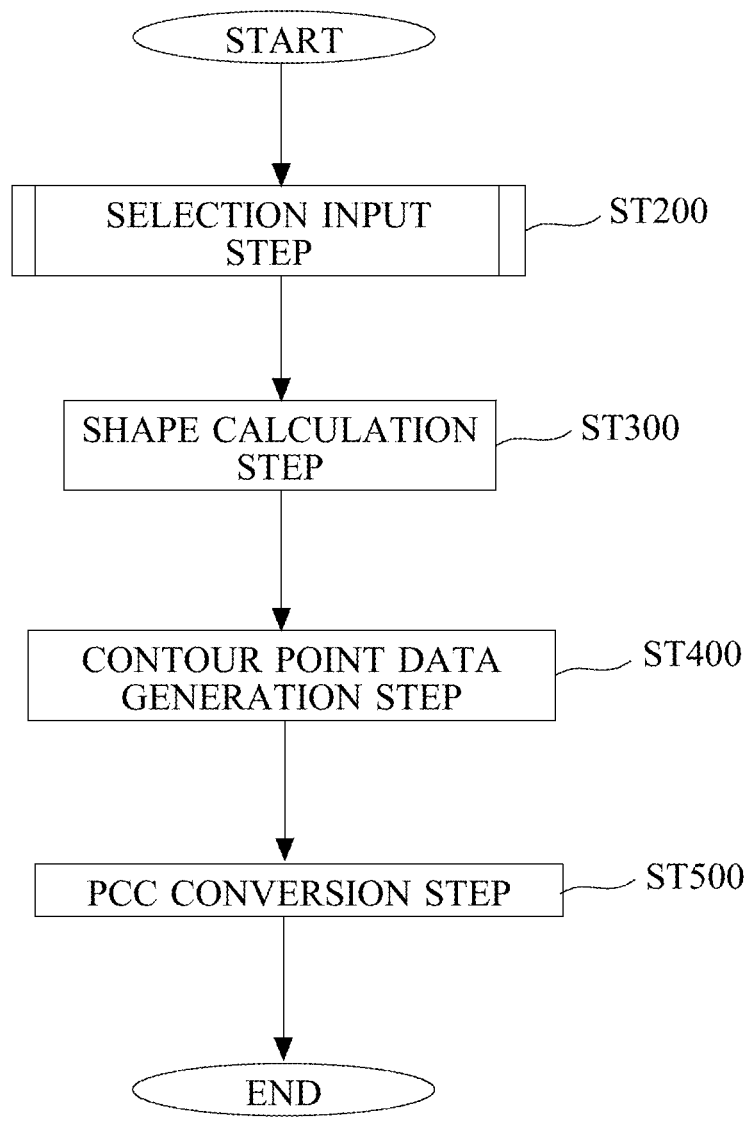
FIG. 5 is a flowchart illustrating a procedure of a preparation step (ST100)

FIG. 5 illustrates the procedures of the preparation step (ST100).

As the preparation step (ST100), first, a selection input step (ST200) which allows a user to select or input necessary information is performed.

Figure 6:
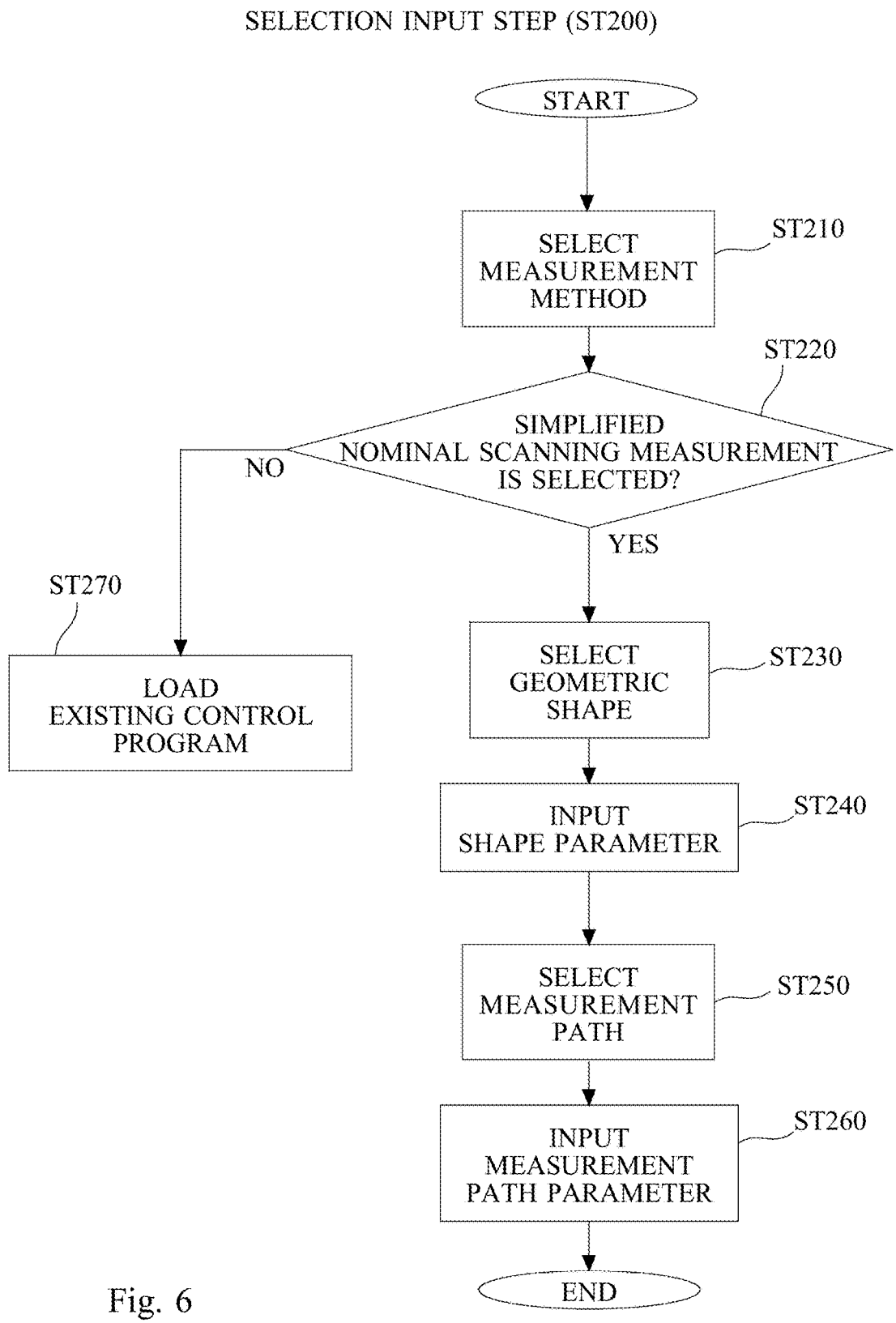
FIG. 6 is a flowchart illustrating a procedure of a selection input step (ST200)

The selection input step (ST200) is detailedly illustrated in FIG. 6.

As the selection input step (ST200), a measurement method is selected by the user (ST210). For example, a selection menu illustrated in FIG. 7 is presented to the user.

The menu of measurement methods includes passive nominal scanning measurement, active nominal scanning measurement, autonomous scanning measurement, and point measurement, and further includes "simplified nominal scanning measurement" in the present exemplary embodiment.

Here, it is assumed that the user selects the "simplified nominal scanning measurement" (ST220: YES).

Since the "simplified nominal scanning measurement" is selected, the simplified-measurement part program allows the user to select a shape of a measurement point from a prepared geometric shape menu (ST230).

Figure 8:
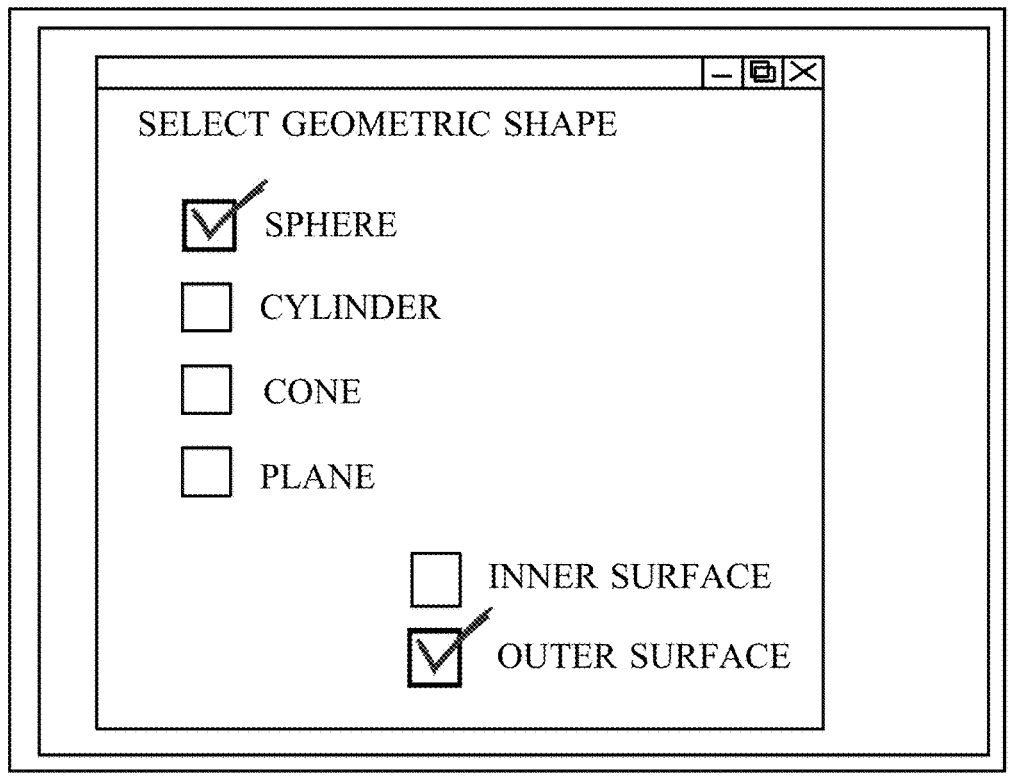
FIG. 8 is a diagram exemplifying a selection menu.

For example, a selection menu illustrated in FIG. 8 is presented to the user.

In this description, the shape menu includes a sphere, a cylinder, a cone, and a plane. In addition, a prism (polygonal prism) and a pyramid (polygonal pyramid) may be included. Furthermore, whether the shape to be measured is an inner surface or an outer surface is selected.

Here, it is assumed that a "sphere" and an "outer surface" are selected.

When the geometric shape is selected, the user is requested to input a parameter necessary for specifying the detail of the selected geometric shape (ST240).

Figure 9:
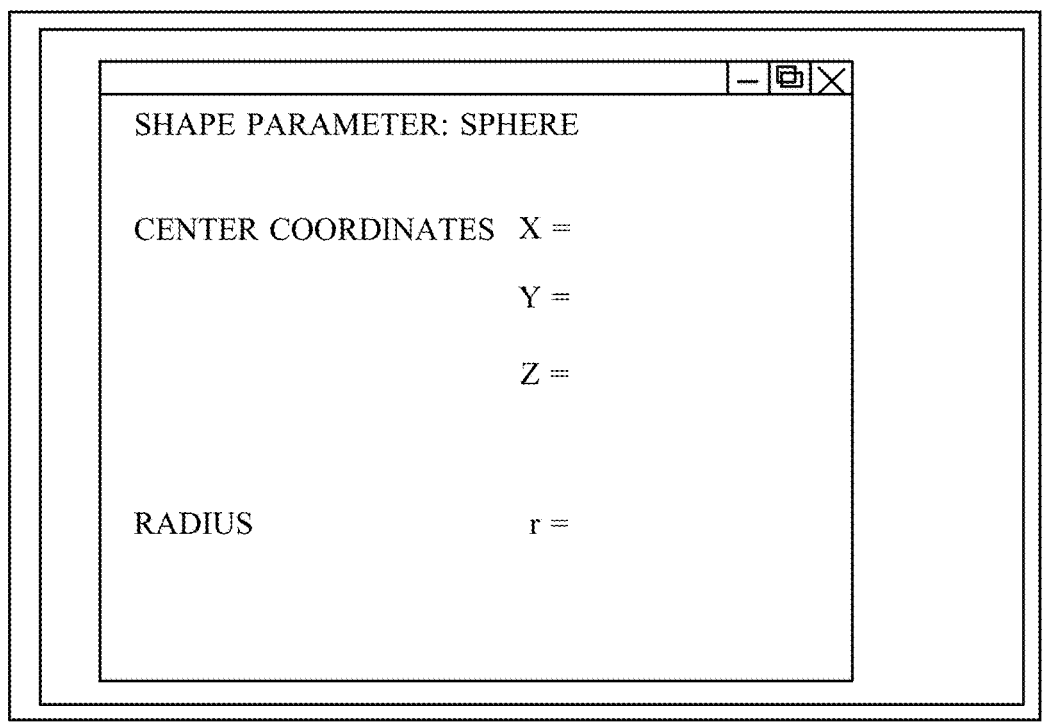
FIG. 9 is a diagram exemplifying an input screen.

Here, a sphere is selected, and a screen to input, for example, center coordinates (x, y, z), and a radius r in an input screen illustrated in FIG. 9 is presented. Thus, the geometric shape of the object to be measured is obtained.

Next, the simplified-measurement part program allows the user to select a pattern of a measurement path.

The simplified-measurement part program allows the user to select a measurement path from a prepared measurement path menu (ST250).

Figure 10:
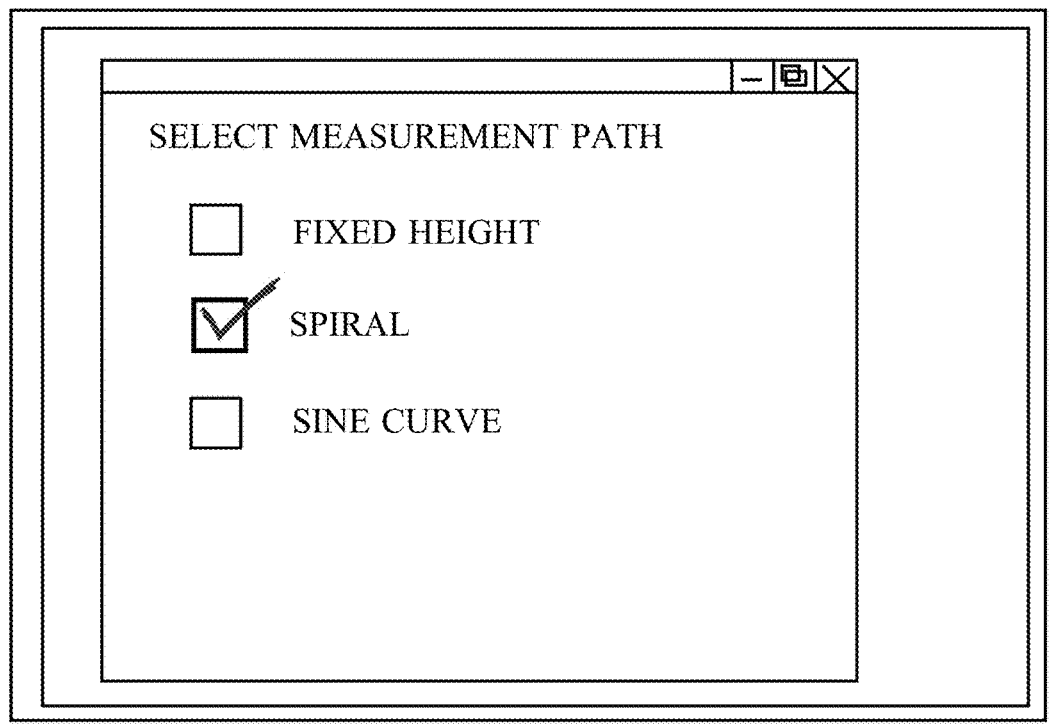
FIG. 10 is a diagram exemplifying a selection menu.

For example, a measurement path menu illustrated in FIG. 10 is presented to the user. Here, a path menu includes a fixed height, a spiral, and a sine curve.

The fixed height means that a z-coordinate is fixed, and the path menu may include, in addition, a fixed x-coordinate, and a fixed y-coordinate, and may allow a user to input an inclined scanning section.

Furthermore, the path menu may be prepared for each geometric shape.

For example, a path menu to perform measurement throughout an object to be measured by zigzagging on a plane may be prepared for a workpiece having a flat surface, such as a plane, a prism, and a pyramid.

Here, it is assumed that a spiral is selected.

When the measurement path is selected, the user is requested to input a parameter necessary for specifying the detail of the selected path (ST260).

Figure 11:
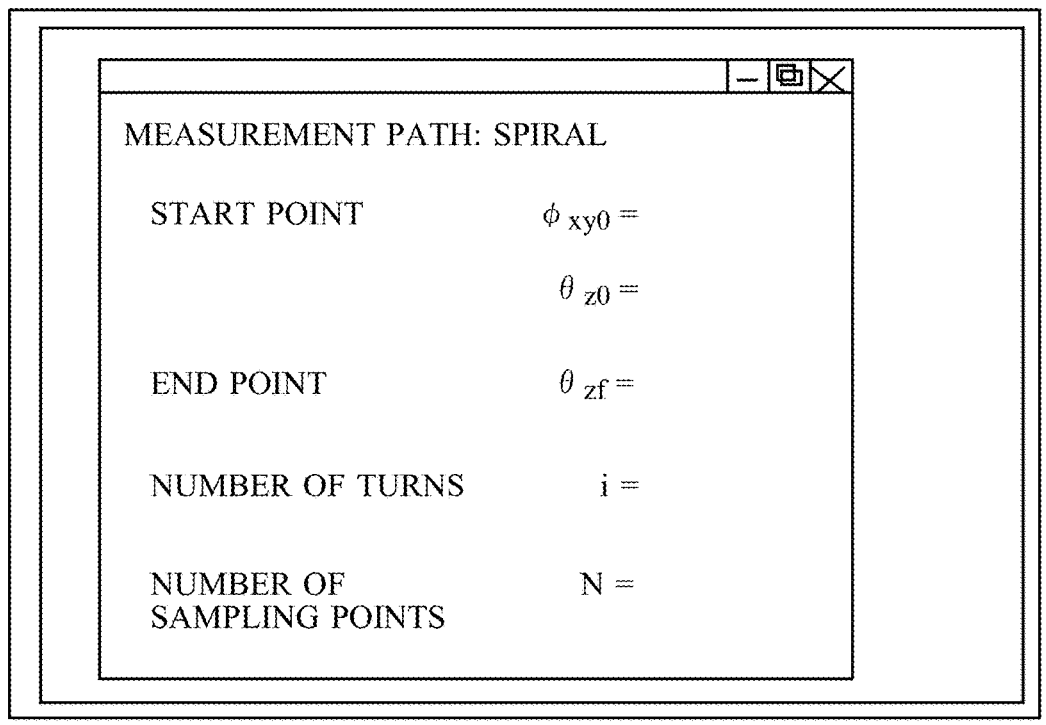
FIG. 11 is a diagram exemplifying an input screen.

Here, since a spiral is selected as the measurement path, a screen to input information, such as a start point ($\varphi_{xy0}$, $\theta_{z0}$), an end point $\theta_{zf}$, the number of turns i, and the number of sampling points N, is presented (FIG. 11).

Figure 12:
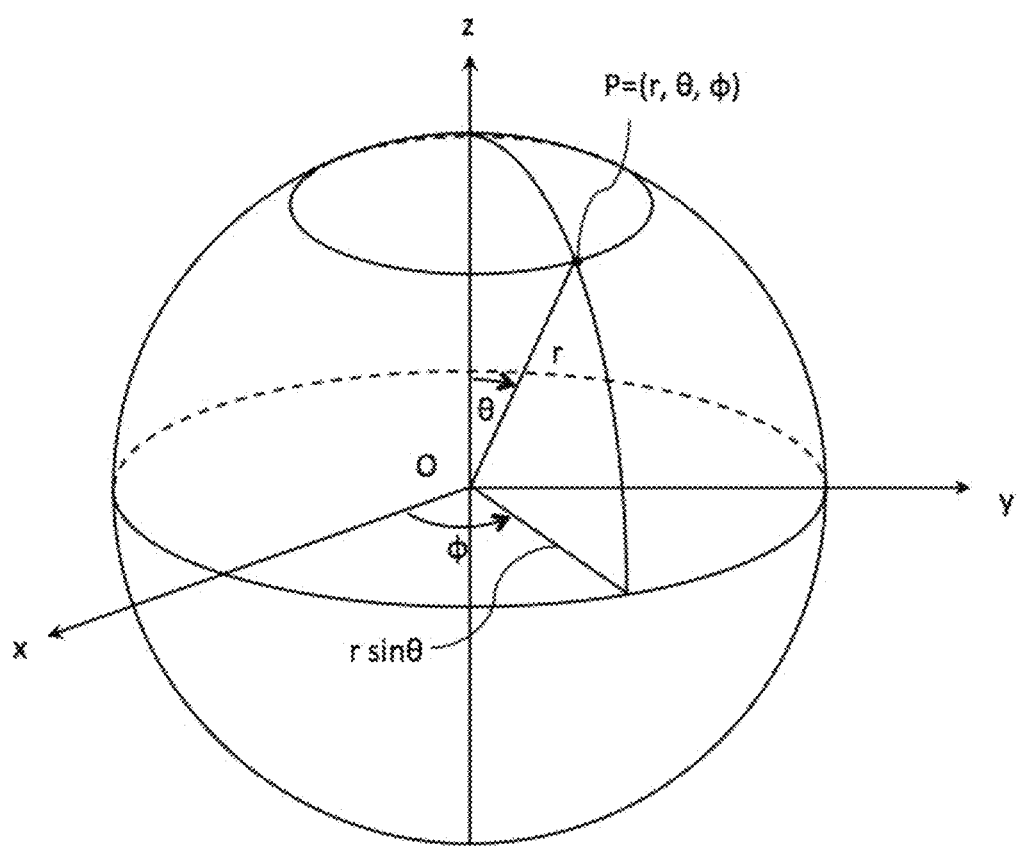
FIG. 12 is a diagram illustrating spherical coordinates.

The angles are defined, for example, as illustrated in FIG. 12.

The angle $\varphi$ is an angle from an X axis in an XY plane.

The angle $\theta$ is an angle from Z axis in a ZY plane.

The number of turns i may include not only integers but also decimal numbers, such as 1.5 and 2.25, and which can omit to input the value p of the end point.

With these steps, the geometric shape of the workpiece which is the object to be measured and the information on the user's desired scanning path are obtained.

Thus, the selection input step (ST200) is terminated.

Following the selection input step (ST200), a shape calculation step (ST300) is performed.

The shape calculation step (ST300) is performed by a shape analysis unit 530 based on the information obtained in the selection input step (ST200).

In the shape calculation step (ST300), measurement points (a point sequence) on the workpiece are calculated using prepared calculation formulae.

Since the workpiece is a sphere, using the spherical coordinates of FIG. 12 and setting the center coordinates of the sphere as an origin, the measurement points (a point sequence) (r, $\theta_{xy}$, $\theta_z$) on the workpiece is indicated as follows:

$$\varphi_{xy} = \varphi_{xy0} + [360i \times \{(k-1)/(N-1)\}]$$

$$\theta_z = \theta_{z0} - [(\theta_{z0} - \theta_{zf}) \times \{(k-1)/(N-1)\}]$$

Here, k indicates the k-th sampling point (k=1, 2, 3 ... N).

The measurement points (point sequence) (r, $\varphi_{xy}$, $\theta_z$) are obtained, and contour point data (x, y, z, P, Q, R) is obtained as follows (ST400).

In other words, the spherical coordinates are converted into orthogonal coordinates with the following calculation formulae:

x=r sin $\theta$ cos $\varphi$
y=r sin $\theta$ sin $\varphi$
z=r cos $\theta$

Furthermore, setting the center of the sphere as an origin, the origin and each of the measurement points (x, y, z) are combined, and thereby the normal line directions (P, Q, R) at each of the measurement points are obtained.

Thus, the coordinates (x, y, z) and the normal line directions (P, Q, R) are obtained for each measurement point, which means that an equivalent to the contour point data is obtained.

Once the contour point data is obtained, the technique for converting the data into a PCC curve is known (JP 2008-241420 A, JP 2013-238573 A, and JP 2014-21004 A).

To be briefly described, the contour point data is offset in the normal line direction by a predetermined amount, and then a PCC curve is calculated (ST500).

With the above procedures, the path for the nominal scanning measurement is obtained. Thus, the preparation step (ST100) is terminated.

Since the preparation step (ST100) is terminated, the host computer 500 instructs the motion controller 300 to perform the nominal scanning measurement (ST610).

The nominal scanning measurement itself has been well known, and the details are omitted.

The brief description is as follows:

The PCC curve is transmitted to the motion controller 300 and temporarily stored in the PCC acquisition unit 310.

The path calculation unit 330 generates a path to measure the workpiece based on the PCC curve.

The path calculation unit 330 generates a path according to the measurement method.

Here, it is assumed that active nominal scanning measurement is to be performed and a path for the active nominal scanning measurement is generated.

(Note That, Paths Generated For the active Nominal Scanning Measurement and the Passive Nominal Scanning Measurement are the Same.)

The path calculation unit 330 sets, based on the curvature of the divided PCC curve, the moving speed of the probe 230, and determines the moving direction and the moving speed (velocity vector) at each point on the PCC curve. The movement of the probe 230 according to the moving vector implements the nominal scanning measurement.

Furthermore, in the case of the active nominal scanning measurement, a vector in the normal line direction (deflection correcting vector) is generated so that the amount of deflection Ep becomes constant, and a trajectory correction direction (trajectory correction vector) to correct the deviation between the center coordinates and the path of the current stylus head 232 is generated. Then, a combined velocity vector, which is obtained by combining the velocity vector, the deflection correcting vector, and the trajectory correction vector, is generated.

The drive control unit 340 supplies drive signals to the coordinate measuring machine 200 according to the combined velocity vector.

Thereby, the coordinate measuring machine 200 measures the workpiece by the active nominal scanning measurement.

The drive signals from the motion controller 300 drive the coordinate measuring machine 200, and thus the active nominal scanning measurement is performed.

The coordinate measuring machine 200 feedbacks detection values (a probe sensor detection value and an encoder detection value) to the host computer 500 through the motion controller 300.

The data obtained by the measurement is stored in the storage unit 520 (ST620). When all of the measurement points on the path are measured (ST630: YES), the measurement is terminated.

With the above described present exemplary embodiment, it is possible to perform nominal scanning measurement without a CAD system or a high-performance PC.

Modified Example 1

Figure 15:
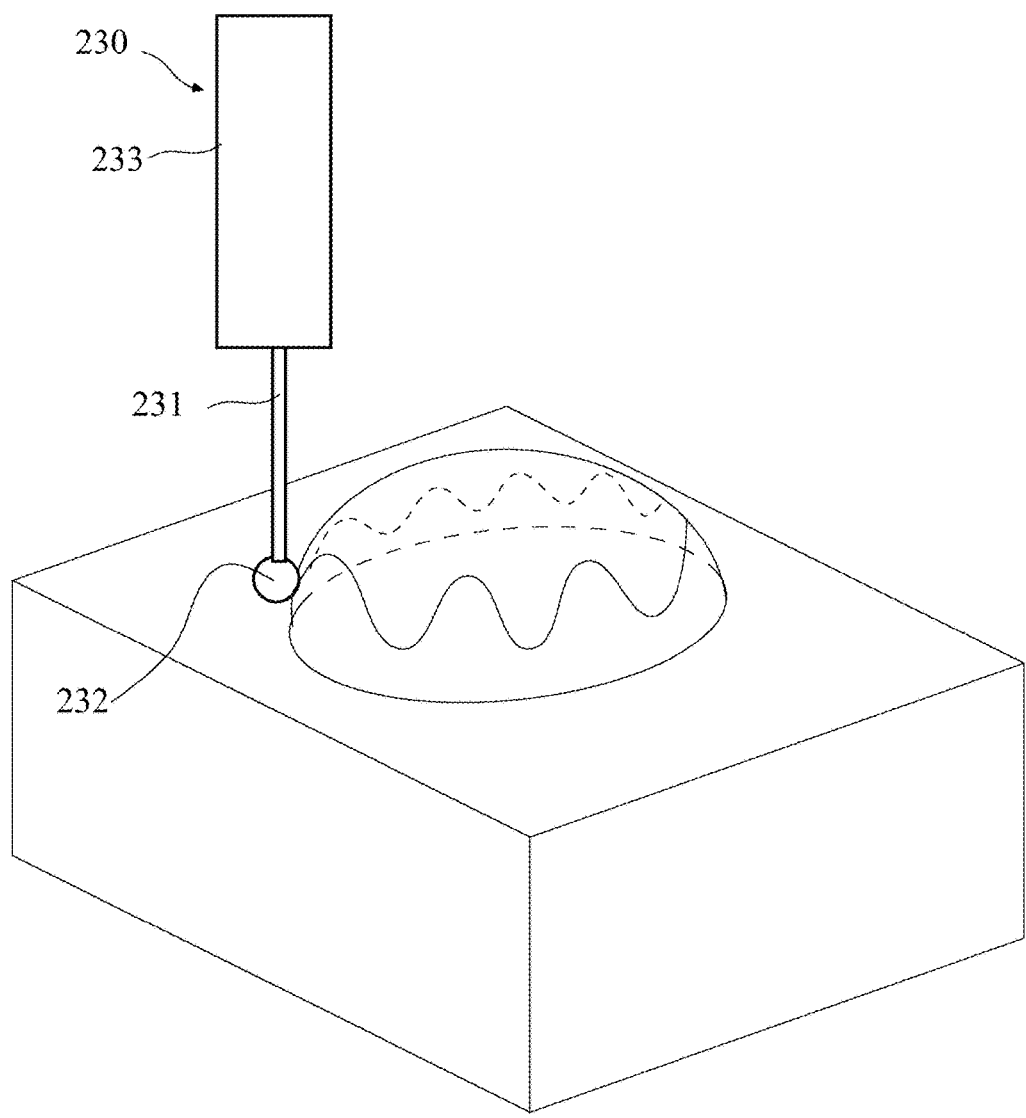
FIG. 15 is diagram illustrating that scanning measurement is performed to a spherical workpiece with a sine curve path.

For reference, the case in which a "sine curve" is selected in a measurement path selection (ST250) will be described. FIG. 15 illustrates an example of a sine curve path for scanning measurement.

Figure 14:
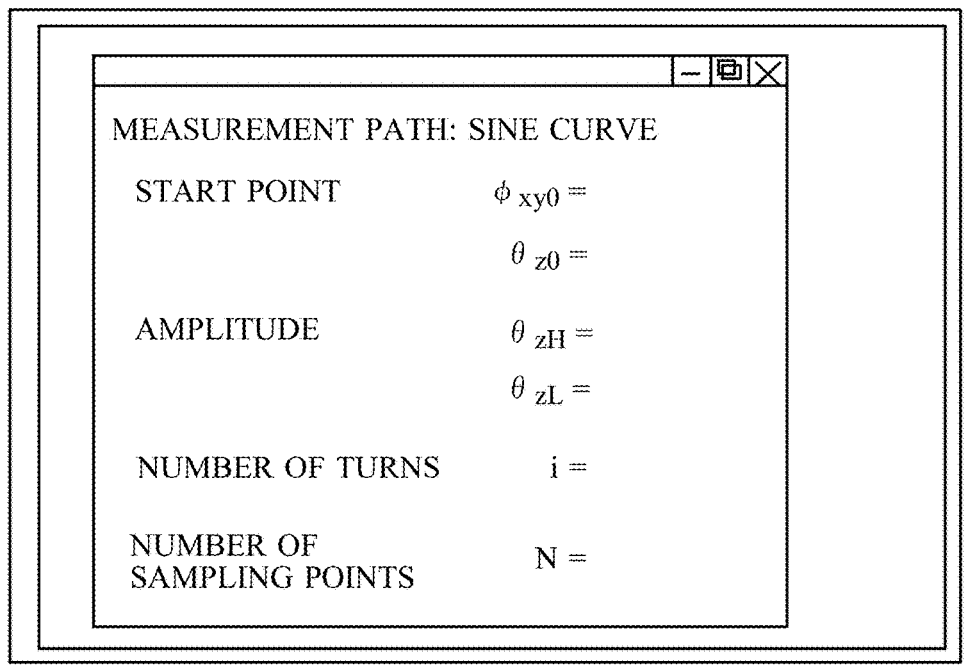
FIG. 14 is a diagram exemplifying an input screen.

When a "sine curve" is selected as a measurement path, a screen to input information, such as a start point ($\theta_{zy0}$, $\theta_{z0}$), amplitude ($\theta_{zH}$, $\theta_{zL}$), the number of turns i, the number of sampling points N, is presented (FIG. 14).

Note that, $\theta_{zH}$ indicates the maximum value of $\theta_z$, and $\theta_{zL}$ indicates the minimum value of $\theta_z$.

With the information, measurement points (a point sequence) (r, $\varphi_{xy}$, $\theta_z$) on a workpiece is indicated as follows:

$$\varphi_{xy} = \varphi_{xy0} + [360 \times \{(k-1)/(N-1)\}]$$

$$\theta_z = (\theta_{zH} + \theta_{zL})/2 \pm \{(\theta_{zH} - \theta_{zL})/2\} \sin[360i \times \{(k-1)/(N-1)\}]$$

If an object to be measured is a sphere, a spherical coordinates system is used, and if an object to be measured is a cylinder, a cylindrical coordinate system is used.

Other processing is the same as above embodiment.

Modified Example 2

When the shape parameter is input (ST240), the center coordinates of the sphere have been input (FIG. 9). However, a menu of "automatic setting of center coordinates" may be added based on the assumption that accurate center coordinates in a machine coordinate system are not immediately obtained.

If it has been known that the shape is a sphere, the center coordinates can be calculated by measuring some points on a workpiece.

When the "automatic setting of center coordinates" is selected, the center coordinates may be obtained by, for example, preliminarily measuring some points on the workpiece by point measurement. The point measurement may be performed automatically or manually by a user.

Note that, the present invention is not limited to the above exemplary embodiments, and can be modified without departing from the scope of the invention.

In the above embodiments, active nominal scanning measurement has been mainly described, but the "active nominal scanning measurement" may be replaced with "passive nominal scanning measurement".

The invention claimed is:

1. A method for controlling a shape measuring apparatus which includes a probe having a stylus head at a tip and a moving mechanism to move the probe, and measures a shape of a workpiece by detecting contact between the stylus head and a surface of the workpiece, the method comprising:
receiving a selection of allowing a user to select a geometric shape type of an object to be measured from a geometric shape menu prepared in advance;
specify a geometric shape corresponding to the selected geometric shape type;
receiving a selection of allowing the user to select a measurement path type from a measurement path menu prepared in advance;
receiving, according to the selected measurement path type, an input parameter to specify a measurement path corresponding to the measurement path type;
based on the selected geometric shape type, the input parameter of the geometric shape, the selected measurement path type, and the input parameter of the measurement path, calculating, by a processor of the shape measuring apparatus, a plurality of measurement points on the workpiece to be scanned, and a normal line direction at each of the measurement points on the workpiece using a calculation formula prepared in advance;
calculating, by the processor, a path for scanning measurement to move while scanning a sequence of the measurement points; and
performing, by the shape measuring apparatus and using the probe, the scanning measurement to scan the path for the scanning measurement.

2. The method for controlling the shape measuring apparatus according to claim 1, wherein the geometric shape menu includes, at least, a sphere type, a columnar body type, a cone body type, and a plane type.

3. The method for controlling the shape measuring apparatus according to claim 1, wherein the measurement path menu includes, at least, a spiral type and a sine curve type.

4. The method for controlling the shape measuring apparatus according to claim 1, further comprising performing shape analysis of the workpiece based on the scanning measurement.

5. The method for controlling the shape measuring apparatus according to claim 1, further comprising:
presenting a number of turns and a number of sampling points corresponding to the selected measurement path type.

6. The method for controlling the shape measuring apparatus according to claim 1, wherein the normal line direction is generated such that an amount of deflection becomes constant.

7. The method for controlling the shape measuring apparatus according to claim 6, wherein a trajectory correction vector is generated to correct a deviation between center coordinates and a path of the stylus head.

8. The method for controlling the shape measuring apparatus according to claim 6, wherein a trajectory correction vector is generated to correct a deviation in the selected measurement path type.

9. A non-transitory computer readable medium storing a control program for the shape measuring apparatus which includes a probe having a stylus head at a tip and a moving mechanism to move the probe, and measures a shape of a workpiece by detecting contact between the stylus head and a surface of the workpiece, the control program executable by a processing unit comprising sets of instructions for:
receiving a selection of allowing a user to select a geometric shape type of an object to be measured from a geometric shape menu prepared in advance;
receiving, according to the selected geometric shape type, an input parameter to specify a geometric shape corresponding to the selected geometric shape type;
receiving a selection of allowing the user to select a measurement path type from a measurement path menu prepared in advance;
receiving, according to the selected measurement path type, an input parameter to specify a measurement path corresponding to the measurement path type;
based on the selected geometric shape type, the input parameter of the geometric shape, the selected measurement path type, and the input parameter of measurement path, calculating, by a processor of the shape measuring apparatus, a plurality of measurement points on the workpiece to be scanned, and a normal line direction at each of the measurement points on the workpiece using a calculation formula prepared in advance;
calculating, by the processor, a path for scanning measurement to move while scanning a sequence of the measurement points; and
performing, by the shape measuring apparatus and using the probe, the scanning measurement to scan the path for the scanning measurement.

* * * * *